US009888368B1

(12) United States Patent
Bertz et al.

(10) Patent No.: US 9,888,368 B1
(45) Date of Patent: *Feb. 6, 2018

(54) METHOD AND SYSTEM FOR DELIVERING SHORT MESSAGE SERVICE (SMS) MESSAGES USING THE SESSION INITIATION PROTOCOL (SIP)

(71) Applicant: Sprint Spectrum L.P., Overland Park, KS (US)

(72) Inventors: Lyle T. Bertz, Lee's Summit, MO (US); William J. Routt, Leawood, KS (US); Ihab A. Guirguis, Chantilly, VA (US); Ronald E. Lewis, Independence, MO (US); Christopher R. Melus, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/481,016

(22) Filed: Apr. 6, 2017

Related U.S. Application Data (63) Continuation of application No. 14/033,921, filed on Sep. 23, 2013, now Pat. No. 9,648,473, which is a
(Continued)

(51) Int. Cl.
*H04W 4/00* (2009.01)
*H04W 4/14* (2009.01)
(Continued)

(52) U.S. Cl.
CPC .............. *H04W 4/14* (2013.01); *H04L 51/066* (2013.01); *H04L 61/1511* (2013.01);
(Continued)

(58) Field of Classification Search
CPC ........... H04M 1/2535; H04M 1/72547; H04M 7/0045; H04M 3/42068; H04M 15/8228; H04W 4/14; H04W 8/26
(Continued)

(56) References Cited

U.S. PATENT DOCUMENTS 6,757,732 B1   6/2004  Sollee et al.
7,054,618 B1   5/2006  McCullough
(Continued)

OTHER PUBLICATIONS

ADC Telecommunications, "Wireless Short Message Service Tutorial", 1999.
(Continued)

*Primary Examiner* — Charles Appiah
*Assistant Examiner* — Jaime Holliday (57) ABSTRACT An Internet Protocol Multimedia Subsystem (IMS) network uses the Session Initiation Protocol (SIP) to provide communication services to mobile nodes. A short message service gateway (SMS-GW) in the IMS network receives a request to deliver a message to a mobile node. The SMS-GW determines whether the mobile node is IMS registered. If the mobile node is IMS registered, the SMS-GW may transmit a SIP MESSAGE request to a call session control function (CSCF) serving the mobile node in order to deliver the message to the mobile node. If the mobile node is SIP-capable but is not IMS registered, the SMS-GW may instead transmit a SIP MESSAGE request to the mobile node's IP address. To obtain the mobile node's IP address, the SMS-GW may query a domain name server (DNS) that stores associations between hostnames and IP addresses of mobile nodes.

20 Claims, 4 Drawing Sheets

Related U.S. Application Data continuation of application No. 11/859,959, filed on Sep. 24, 2007, now Pat. No. 8,543,107.

(51) Int. Cl.

| | |
|---|---|
| *H04L 29/06* | (2006.01) |
| *H04L 29/12* | (2006.01) |
| *H04L 12/58* | (2006.01) |
| *H04M 1/253* | (2006.01) |
| *H04M 7/00* | (2006.01) |
| *H04M 15/00* | (2006.01) |
| *H04M 1/725* | (2006.01) |
| *H04W 8/26* | (2009.01) |
| *H04M 3/42* | (2006.01) |

(52) U.S. Cl.
CPC ...... *H04L 61/1529* (2013.01); *H04L 61/1588* (2013.01); *H04L 65/1006* (2013.01); *H04L 65/1033* (2013.01); *H04M 1/2535* (2013.01); *H04M 1/72547* (2013.01); *H04M 3/42068* (2013.01); *H04M 7/0045* (2013.01); *H04M 15/8228* (2013.01); *H04W 8/26* (2013.01)

(58) Field of Classification Search
USPC ................ 455/422.1, 435.1, 432.1, 445–560
See application file for complete search history.

(56) References Cited

U.S. PATENT DOCUMENTS

| | | |
|---|---|---|
| 7,139,833 B2 | 11/2006 | Heller |
| 7,143,187 B1 | 11/2006 | Takeda et al. |
| 7,162,529 B2 | 1/2007 | Morishige et al. |
| 7,181,537 B2 | 2/2007 | Costa-Requena et al. |
| 7,443,825 B2 | 10/2008 | Sumner |
| 7,447,162 B1 | 11/2008 | Leung et al. |
| 7,543,227 B2 | 6/2009 | Griswold et al. |
| 7,774,592 B2 | 8/2010 | Ishikawa et al. |
| 7,970,939 B1 | 6/2011 | Satish et al. |
| 8,250,219 B2 | 8/2012 | Raciborski et al. |
| 8,543,107 B1 | 9/2013 | Bertz et al. |
| 9,648,473 B1 | 5/2017 | Bertz et al. |
| 2003/0016639 A1 | 1/2003 | Kransmo et al. |
| 2003/0027595 A1 | 2/2003 | Ejzak |
| 2004/0103157 A1 | 5/2004 | Requena et al. |
| 2005/0003838 A1 | 1/2005 | McCann et al. |
| 2005/0117602 A1 | 6/2005 | Carrigan et al. |
| 2005/0282565 A1 | 12/2005 | Shaheen |
| 2006/0098621 A1 | 5/2006 | Plata Andres et al. |
| 2006/0120362 A1 | 6/2006 | Westman et al. |
| 2006/0206504 A1 | 9/2006 | Cai et al. |
| 2006/0256748 A1 | 11/2006 | Jung et al. |
| 2006/0271687 A1 | 11/2006 | Alston et al. |
| 2006/0274706 A1 | 12/2006 | Chen et al. |
| 2006/0276137 A1 | 12/2006 | Pummill et al. |
| 2006/0276139 A1 | 12/2006 | Pummill et al. |
| 2006/0281474 A1 | 12/2006 | Domville et al. |
| 2007/0002840 A1 | 1/2007 | Song et al. |
| 2007/0008957 A1 | 1/2007 | Huang |
| 2007/0014301 A1 | 1/2007 | Miller et al. |
| 2007/0032251 A1 | 2/2007 | Shaheen |
| 2007/0043829 A1 | 2/2007 | Dua |
| 2007/0061397 A1 | 3/2007 | Gregorat et al. |
| 2007/0071221 A1 | 3/2007 | Allen et al. |
| 2007/0133574 A1 | 6/2007 | Tejani et al. |
| 2007/0243891 A1 | 10/2007 | Civanlar et al. |
| 2008/0267167 A1 | 10/2008 | Apelqvist |

OTHER PUBLICATIONS

3rd Generation Partnership Project 2, "Short Message Service over IMS", 3GPP2 X.P0048-0, Version 7, Oct. 2006.
P. Vixie et al., Network Working Group, "Dynamic Updates in the Domain Name System (DNS Update)", Request for Comments: 2136, Apr. 1997.
C. Rigney et al., Network Working Group, "Remote Authentication Dial in User Service (RADIUS)", Request for Comments: 2865, Jun. 2000.
C. Rigney, Network Working Group, "RADIUS Accounting", Request for Comments: 2866, Jun. 2000.
B. Campbell et al., Network Working Group, "Session Initiation Protocol (SIP) Extension for Instant Messaging", Request for Comments: 3428, Dec. 2002.
R. Arends et al., Network Working Group, "DNS Security Introduction and Requirements", Request for Comments: 4033, Mar. 2005.
R. Arends et al., Network Working Group, "Resource Records for the DNS Security Extensions", Request for Comments: 4034, Mar. 2005.
R. Arends et al., Network Working Group, "Protocol Modifications for the DNS Security Extensions", Request for Comments: 4035, Mar. 2005.

METHOD AND SYSTEM FOR DELIVERING SHORT MESSAGE SERVICE (SMS) MESSAGES USING THE SESSION INITIATION PROTOCOL (SIP)

CROSS-REFERENCE TO RELATED APPLICATIONS

This application is a continuation of U.S. patent application Ser. No. 14/033,921, filed Sep. 23, 2013, which is a continuation of U.S. patent application Ser. No. 11/859,959, filed Sep. 24, 2007, now U.S. Pat. No. 8,543,107. The foregoing applications are incorporated herein by reference.

BACKGROUND

1. Field of the Invention

The present invention relates to telecommunications and, more particularly, to methods and systems for using a packet-based protocol, such as the Session Initiation Protocol (SIP), to provide communication services to mobile nodes, such as delivering short message service (SMS) messages to mobile nodes.

2. Description of Related Art

Text messaging has become a popular method of communicating using wireless telephones. The Short Message Service (SMS) protocol has been used to provide this text messaging capability. Relevant aspects of SMS are described in the IS-41 standards published by the Telecommunication Industry Association and in the GSM MAP standards published by the European Telecommunication Standards Institute. A recent revision of the IS-41 standards, titled "Cellular Radio telecommunications Intersystem Operations," TIA/EIA/IS-41-D, published in 1997, is incorporated herein by reference.

Wireless telephones are also increasingly being used for packet-based communication. One approach for providing packet-based communication services to user equipment (UE) such as wireless telephones is based on a network architecture known as the Internet Protocol Multimedia Subsystem (IMS). The IMS approach is described in various documents that are published by the 3$^{rd}$ Generation Partnership Project 2 (3GPP2), including the following documents that are incorporated herein by reference:

"All-IP Core Network Multimedia Domain: IP Multimedia Subsystem—Stage 2," 3GPP2 X.50013-002-A, version 1.0, published November 2005;

"All-IP Core Network Multimedia Domain: IP Multimedia (IMS) Session Handling; IP Multimedia (IM) Call Model; Stage 2," 3GPP2 X.50013-003-A, version 1.0, published November 2005; and "All-IP Core Network Multimedia Domain: IP Multimedia Call Control Protocol Based on SIP and SDP; Stage 3," 3GPP2 X.50013-004-A, version 1.0, published November 2005.

As the third document suggests, the IMS approach (as currently envisioned) uses the Session Initiation Protocol (SIP) and the Session Description Protocol (SDP) to provide communication services to UEs. Relevant aspects of SIP are described in J. Rosenberg et al., "SIP: Session Initiation Protocol," Request for Comments 3261, June 2002, which is incorporated herein by reference. Relevant aspects of SDP are described in M. Handley et al., "SDP: Session Description Protocol," Request for Comments 4566, July 2006, which is incorporated herein by reference.

Recently, an IMS approach for delivering SMS messages has been proposed. See 3$^{rd}$ Generation Partnership Project 2, "Short Message Service over IMS," 3GPP2 X.P0048-0, version 0.7, published October 2006. In this proposal, a short message service gateway (SMS-GW) uses the SIP MESSAGE method to transmit SMS messages.

The SIP MESSAGE method is described in B. Campbell et al., "Session Initiation Protocol (SIP) for Instant Messaging," Request for Comments 3428, dated December 2002, which is incorporated herein by reference.

SUMMARY

In a first principal aspect, an exemplary embodiment provides a method in which a messaging gateway receives a request to deliver a message to a mobile node, the request including an identifier of the mobile node. The messaging gateway queries a domain name server (DNS) to obtain a network address of the mobile node based on the identifier. The messaging gateway uses a packet-based protocol to transmit the message to the network address.

In a second principal aspect, an exemplary embodiment provides a method for communicating with a mobile node via an Internet Protocol Multimedia Subsystem (IMS) network. The IMS network includes and an application server and a home subscriber server (HSS). In accordance with the method, the application server receives a request to provide communication services to the mobile node, the request including an identifier of the mobile node. In response to the request, the application server determines whether the mobile node is IMS registered. If the mobile node is IMS registered, the application server transmits a packet-based protocol request to a call session control function (CSCF) serving the mobile node. If the mobile node is not IMS registered, the application server queries an alternative registry to obtain a network address of the mobile node based on the identifier and transmits an alternative packet-based protocol request to the network address.

In a third principal aspect, an exemplary embodiment provides a system comprising a domain name server (DNS) storing associations between hostnames and Internet Protocol (IP) addresses of mobile nodes, and a messaging gateway communicatively coupled to the DNS. The messaging gateway is configured to, in response to receiving a request to deliver a message to a mobile node that is Session Initiation Protocol (SIP) capable: (a) determine a hostname of the mobile node based on the request; (b) query the DNS to obtain an IP address associated with the hostname; and (c) transmit a SIP request to the IP address.

In a fourth principal aspect, an exemplary embodiment provides a system comprising a domain name server (DNS) storing Internet Protocol (IP) addresses of mobile nodes and an IP Multimedia Subsystem (IMS) network comprising a home subscriber server (HSS), an application server, and a call session control function (CSCF). The application server is configured to, in response to receiving a request to provide a communication service to a mobile node: (a) determine whether the mobile node is registered with the HSS; (b) if the mobile node is registered with the HSS, transmit a first-route SIP request to the CSCF; and (c) if the mobile node is not registered with the HSS, query the DNS to obtain an IP address of the mobile node and transmit a second-route SIP request to the IP address.

DETAILED DESCRIPTION OF EXEMPLARY EMBODIMENTS

1. Overview

The inventors have recognized that the aforementioned proposal titled "Short Message Service over IMS" does not fully utilize the capability of using SIP to deliver SMS messages to mobile nodes. In particular, the proposal requires a mobile node to be IMS registered in order to receive SMS messages using SIP. To become IMS registered, a mobile node must transmit and receive SIP messages in a manner that conforms to IMS standards. Because IMS registration requirements are more stringent than simply being able to support SIP, a substantial number of mobile nodes that are SIP-capable lack the capability of effecting an IMS registration.

The inventors have recognized that SIP can still be used to deliver SMS messages to SIP-capable mobile nodes that lack IMS-registration capability. When a short message service gateway (SMS-GW) in an IMS network receives a request to deliver an SMS message to a mobile node, the SMS-GW may locate the mobile node without relying on an IMS registration for the mobile node. For example, the SMS-GW may obtain an IP address of the mobile node by querying a domain name server (DNS) that stores associations between hostnames and IP addresses of mobile nodes. The SMS-GW may then transmit a SIP MESSAGE request containing the SMS message to the mobile node's IP address.

To query the DNS, the SMS-GW may determine a hostname of the mobile node based on an identifier of the mobile node that the SMS-GW received in the request. The identifier could be, for example, a mobile directory number (MDN), of the mobile node. In that case, the hostname could be constructed by concatenating the MDN with a domain name of the mobile node's wireless service provider. Thus, the hostname of a mobile node that has 816-555-1234 as its MDN and a wireless service plan with Sprint Nextel might be 8165551234.sprintnextel.com.

In addition to SMS messages, other types of messages could be delivered to mobile nodes using this approach. For example, one or more messaging gateways could be used to deliver SMS messages, Multimedia Messaging Service (MMS) messages, and/or instant messages (IMs) to mobile nodes. A messaging gateway may use the SIP MESSAGE method to transmit such messages to a mobile node's IP address. Alternatively, a messaging gateway may use other packet-based protocols.

This approach may also be used to provide other types of communication services to mobile nodes. For example, an application server in an IMS network may use a packet-based protocol, such as SIP, to provide communication services to mobile nodes. Such communication services could include, for example, messaging services (such as SMS), voice-over-packet (VoP) communications, push-to-talk (PTT) conferencing, streaming media services, or gaming services.

A messaging gateway or application server may query a DNS to locate a mobile node based on one or more factors, such as the type of communication service being requested, the capabilities of the mobile node, and/or whether the mobile node is IMS registered. As one example, when an SMS-GW receives a request to deliver an SMS message to a mobile node, the SMS-GW may query a capabilities server to determine whether the mobile node is capable of receiving the SMS message over SIP. If the mobile node is SIP-capable, then the SMS-GW may query the DNS to obtain the mobile node's IP address and transmit a SIP MESSAGE request containing the SMS message to the mobile node's IP address. The SMS-GW might deliver SMS messages in this way for all SIP-capable mobile nodes that have a DNS entry, or only for SIP-capable mobile nodes that are not IMS registered. If the mobile node is not SIP-capable, then the SMS-GW may use IS-41 SMS signaling to transmit the SMS message to a mobile switching center (MSC) serving the mobile node.

As another example, when an application server receives a request to provide a communication service to a mobile node, the application server may determine whether the mobile node is IMS registered (e.g., by querying the HSS). If the mobile node is IMS registered, the application server may transmit a SIP request to the S-CSCF currently serving the mobile node. If the mobile node is not IMS registered, the application server may query a DNS to obtain the mobile node's IP address and then transmit a SIP request to that IP address.

The DNS may store hostnames and IP addresses of mobile nodes based on registrations that are made by, or on behalf, of mobile nodes. For example, a mobile node may register an association between its hostname and IP address by sending a DNS UPDATE message to the DNS server. A recent version of the DNS UPDATE protocol is described in P. Vixie et al., "Dynamic Updates in the Domain Name System (DNS UPDATE)," Request for Comments 2136, April 1997, which is incorporated herein by reference. A mobile node may also register other information in this way. For example, in addition to hostname and IP address, a mobile node may register a port number that it uses to receive SIP requests.

Alternatively, a registration proxy may effect registrations in the DNS on behalf of mobile nodes. For example, when the registration proxy determines that a mobile node has established a network connection, the registration proxy may automatically register the mobile node with the DNS. An authentication, authorization, and accounting (AAA) server may receive status messages regarding the network presence of mobile nodes. When the AAA determines from these status messages that a mobile node has established a network connection, the AAA may send a notification to the registration proxy. The notification may include various types of information regarding the mobile node, e.g., the mobile node's MDN and IP address. The registration proxy may then determine the mobile node's hostname based on the MDN and register an association between the mobile node's hostname and IP address with the DNS.

2. Exemplary Network Architecture

Figure 1:
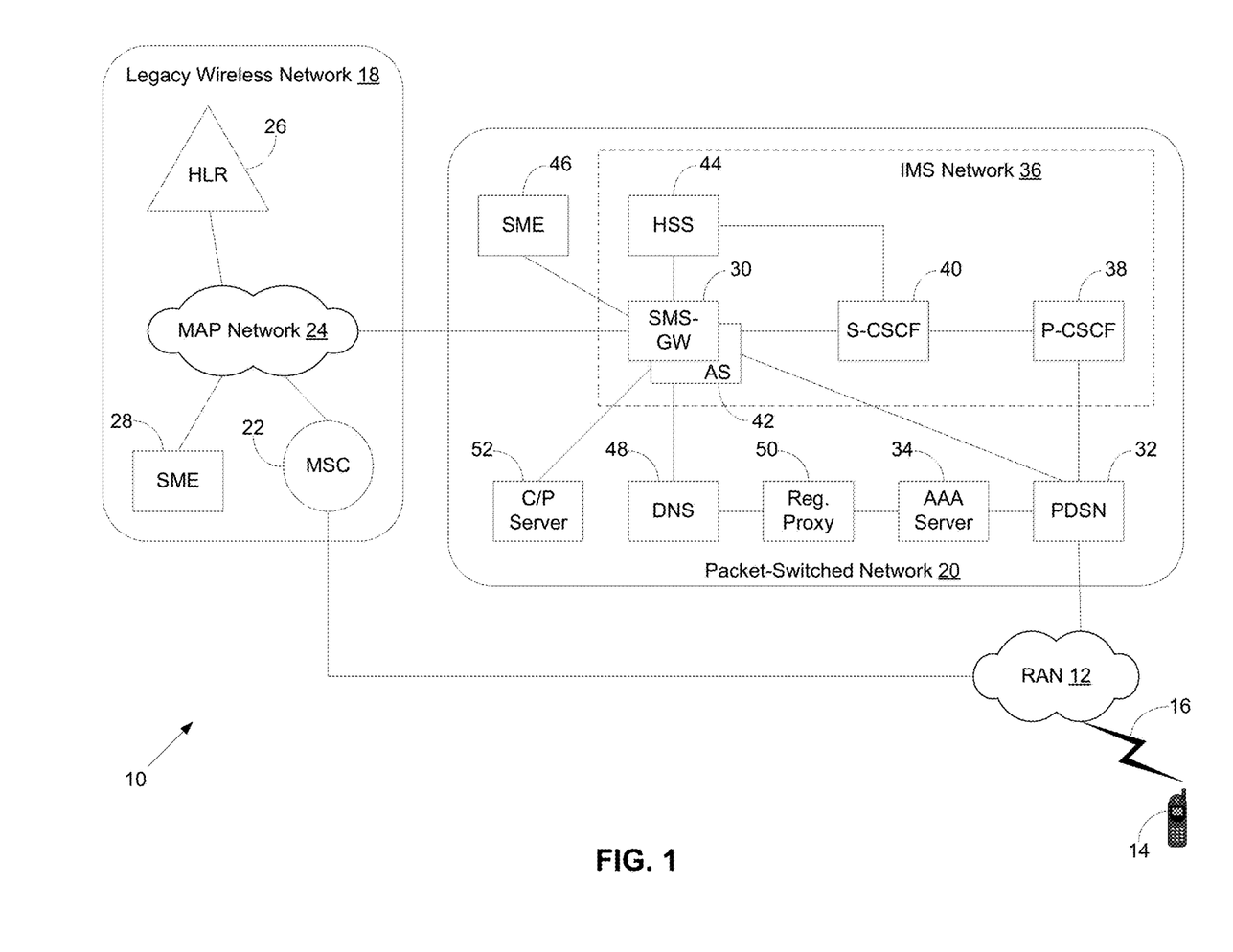
FIG. 1 is a block diagram of a telecommunications network, in accordance with an exemplary embodiment.

FIG. 1 illustrates an exemplary telecommunications network 10. Telecommunications network 10 includes a radio access network (RAN) 12 that can communicate with one or more mobile nodes, such as mobile node 14, via an air interface 16. Mobile node 14 could be, for example, a wireless telephone, a wireless personal digital assistant (PDA), a wirelessly equipped notebook computer, or other wireless communication device. The communications over air interface 16 may correspond to cdma2000, EVDO, GSM, WiFi (IEEE 802.11), WiMAX (IEEE 802.16) or some other wireless format. Thus, RAN 12 may include one or more base transceiver stations (BTSs), base station controllers (BSCs), radio network controllers, (RNCs), wireless access points, and/or other network elements to provide wireless coverage in a given area.

Mobile node 14 may communicate over air interface 16 in order to send and/or receive voice, data, or other media. Examples of services in which mobile node 14 may use air interface 16 include without limitation originating and receiving voice calls, sending and receiving text or multimedia messages, sending and receiving e-mail messages, Web browsing, location-based services, receiving streaming video or other media, and gaming services.

To provide such services, RAN 12 may be communicatively coupled to one or more networks, such as legacy wireless network 18 and packet-switched network 20. Legacy wireless network 18 may include one or more circuit-switched elements for switching voice calls, as exemplified in FIG. 1 by mobile switching center (MSC) 22 connected to RAN 12. MSC 22 may, in turn, have bearer connections to other circuit-switched elements, such as other MSCs and/or the public switched telephone network (PSTN).

Legacy wireless network 18 may also include a Mobile Application Part (MAP) network 24 that carries MAP signaling. MSC 22 may engage in MAP signaling with various network elements in legacy wireless network 18 via MAP network 24. As one example, MSC 22 may communicate with a home location register (HLR) 26, e.g., to register mobile nodes or locate mobile nodes. As another example, MSC 22 may communicate with other MSCs via MAP network 24.

MAP signaling carried in MAP network 24 may also be used to deliver SMS messages. In this regard, one or more short messaging entities (SMEs) that are able to send and/or receive SMS messages may be communicatively coupled to MAP network 24, as exemplified in FIG. 1 by SME 28. It is to be understood that SME 28 could correspond to a mobile node served by an MSC, or SME 28 could correspond to a fixed network element, e.g., a network element that provides notification services or other information services to mobile nodes.

In an exemplary embodiment, SME 28 may transmit text in the form of an SMS message, using a mobile directory number (MDN) or other identifier to identify mobile node 14 as the intended recipient. A short message service delivery point-to-point (SMDPP) request that includes the text of the message and the MDN or other identifier used to identify mobile node 14 as the intended recipient may then be transmitted via MAP network 24. In some cases, MAP network 24 may route the SMDPP request to MSC 22 as the MSC currently serving mobile node 14. MSC 22 may then transmit the text of the message to RAN 12 for delivery to mobile node 14 via air interface 16. Alternatively, MAP network 24 may route the SMDPP request to a short message service gateway (SMS-GW) 30 for delivery to mobile node 14 via packet-switched network 20, as described in more detail below.

Packet-switched network 20 is a network that conveys voice, data, and/or other media in the form of packets. It may include one or more private networks and/or public networks, which may be local area networks (LANs), metropolitan area networks (MANs) or wide area networks (WANs). For example, packet-switched network 20 may include the Internet. Packets may be routed in packet-switched network 20 based on network addresses, e.g., using the Internet Protocol (IP) in combination with the User Datagram Protocol (UDP) or Transmission Control Protocol (TCP).

Packet-switched network 20 may include a packet data serving node (PDSN) 32 that is communicatively coupled to RAN 12. PDSN 32 may function as a network access server providing mobile nodes, such as mobile node 14, with access to packet-switched network 20. Before providing network access to a mobile node, such as mobile node 14, PDSN 32 may first authenticate the mobile node and confirm that such network access is authorized, for example, by communicating with an authentication, authorization, and accounting (AAA) server 34. Such communication for authentication/authorization purposes may, for example, make use of RADIUS protocols. The basic RADIUS protocol is described in C. Rigney et al., "Remote Authentication Dial In User Service (RADIUS)," Request for Comments 2865, June 2000, which is incorporated herein by reference.

Once a mobile node is granted access to packet-switched network 20, PDSN 32 may transmit status messages to AAA server 34 regarding services provided to the mobile node. These status messages may, for example, make use of the RADIUS Accounting protocol. The basic RADIUS Accounting protocol is described in C. Rigney, "RADIUS Accounting," Request for Comments 2866, June 2000, which is incorporated herein by reference. In accordance with the RADIUS Accounting protocol, PDSN 32 transmits a START packet at the beginning of service delivery and transmits a STOP packet at the end of service delivery.

Packet-switched network 20 may also include an IMS network 36 that is able to provide communication services to mobile nodes using SIP. IMS network 36 may include a proxy call session call function (P-CSCF) 38 that sends and receives SIP messages to mobile nodes, such as mobile node 14, via PDSN 32 and RAN 12. More particularly, P-CSCF 38 may serve as a proxy for a serving call session control function (S-CSCF) 40. Thus, P-CSCF 38 may forward SIP messages received from S-CSCF 40 to PDSN 32 (for delivery to mobile nodes via RAN 12), and P-CSCF 38 may forward SIP messages received from mobiles nodes via RAN 12 and PDSN 32 to S-CSCF 40.

The service logic for providing services to mobile nodes may be contained in one or more application servers, exemplified in FIG. 1 by application server (AS) 42. As described in more detail below, SMS-GW 30 may also function as an application server for purposes of providing messaging services. Thus, to provide services to mobile nodes in accordance with the IMS approach, SMS-GW 30 and AS 42 may receive SIP messages from S-CSCF 40 and may send SIP messages to S-CSCF 40. However, as described in more detail below, SMS-GW 30 and/or AS 42 may also provide services to mobile nodes without going through S-CSCF 40 and P-CSCF 38. For example, SMS-GW 30 and/or AS 42 may send SIP messages directly to a network element that corresponds to the mobile node's IP address (e.g., PDSN 32).

IMS network 36 may also include a home subscriber server (HSS) 44 that maintains IMS registrations of mobile nodes. HSS 44 may be communicatively coupled to S-CSCF 40, SMS-GW 30, and AS 42. To effect an IMS registration of a mobile node, S-CSCF 40 may communicate with HSS 44 to register an association between one or more identifiers of the mobile node and an identifier of S-CSCF 40. Thereafter, to locate an IMS-registered mobile node, SMS-GW 30 or AS 42 may query HSS 44 to determine which S-CSCF is currently serving the mobile node. In this regard, although IMS network 36 is shown in FIG. 1 with only one S-CSCF and only one P-CSCF, IMS network 36 may include multiple S-CSCFs and multiple P-CSCFs. It is also to be understood that IMS network 36 may also include other types of network elements.

Thus, SMS-GW 30 may query HSS 44 to determine where to send a SIP MESSAGE request that contains the text of an SMS message to be delivered to a mobile node (e.g., mobile node 14). For example, SMS-GW 30 may receive, via MAP network 24, an SMDPP request that identifies mobile node 14 as the recipient (e.g., by including the MDN of mobile node 14). In response, SMS-GW 30 may query HSS 44 based on the MDN. If mobile node 14 is IMS-registered, then HSS 44 may respond to the query by identifying S-CSCF 40 as currently serving mobile node 14. SMS-GW 30 may then a SIP MESSAGE request to S-CSCF 40, wherein the SIP MESSAGE request contains the text of the SMS message and identifies mobile node 14 by a SIP URI. S-CSCF 40 may then forward the SIP MESSAGE request to P-CSCF 38, which, in turn, forwards the SIP MESSAGE request to delivery to mobile node 14 via RAN 12. In this way, mobile node 14 may receive SMS messages via SIP.

It is to be understood that SMS-GW 30 may receive SMS messages from sources other than MAP network 24. For example, SMS-GW 30 may receive SIP MESSAGE requests from short messaging entities within packet-switched network 20, as exemplified in FIG. 1 by SME 46. It is also to be understood that other elements of IMS network 36, such as AS 42, may also receive requests, e.g., from MAP network 24 or from entities within packet-switched network 20, to provide services to mobile nodes. In response to such requests, AS 42 may likewise query HSS 44 to determine which 5-CSCFs to send SIP requests to provide the requested services.

However, the IMS approach described above relies on having an IMS registration in HSS 44. Because not all mobile nodes may be able to effect an IMS registration, packet-switched network 20 may also include one or more alternative registries. For example, packet-switched network 20 may include a domain name server (DNS) 48 that is communicatively coupled to SMS-GW 30 and AS 42. DNS 48 stores associations between hostnames and IP addresses of mobile nodes. As described in more detail below, SMS-GW 30 and/or AS 42 may query DNS 48 as an alternative way to determine how to route a SIP request for delivery to a particular mobile node. Thus, SMS-GW 30 or AS 42 may query DNS 48 based on a mobile node's hostname to determine the mobile node's IP address and may then send a SIP message to that IP address (which may correspond to PDSN 32).

The association between a mobile node's hostname and IP address that is stored in DNS 48 may be registered by the mobile node itself, e.g., using DHCP or a DNS UPDATE request. Alternatively, a registration proxy 50 may effect registrations in DNS 48 on behalf of mobile nodes. To perform registrations in DNS 48 automatically, registration proxy 50 may be communicatively coupled to AAA server 34, and AAA server 34 may push information to registration proxy 50 in response to receiving RADIUS and/or RADIUS Accounting messages from PDSN 32. For example, PDSN 32 may send a RADIUS Accounting START message to AAA server 34 when PDSN 32 begins providing packet-data service for a mobile node (e.g., mobile node 14). In response, AAA server 34 may push information from the RADIUS Accounting START message to registration proxy 50. Registration proxy 50 may then use the information to register the mobile node with DNS 48, for example, using the DNS UPDATE protocol.

SMS-GW 30 and AS 42 may also be communicatively coupled to a capabilities/preferences (C/P) server 52. CP server 52 may store information regarding capabilities and preferences of mobile nodes, such as mobile node 14. Such information may include, for example, whether a mobile node is capable of IMS registration and, if not, whether the mobile node is nonetheless capable (and prefers) to receive services (such as messaging services) via SIP.

3. Exemplary Registration Method

Figure 2:
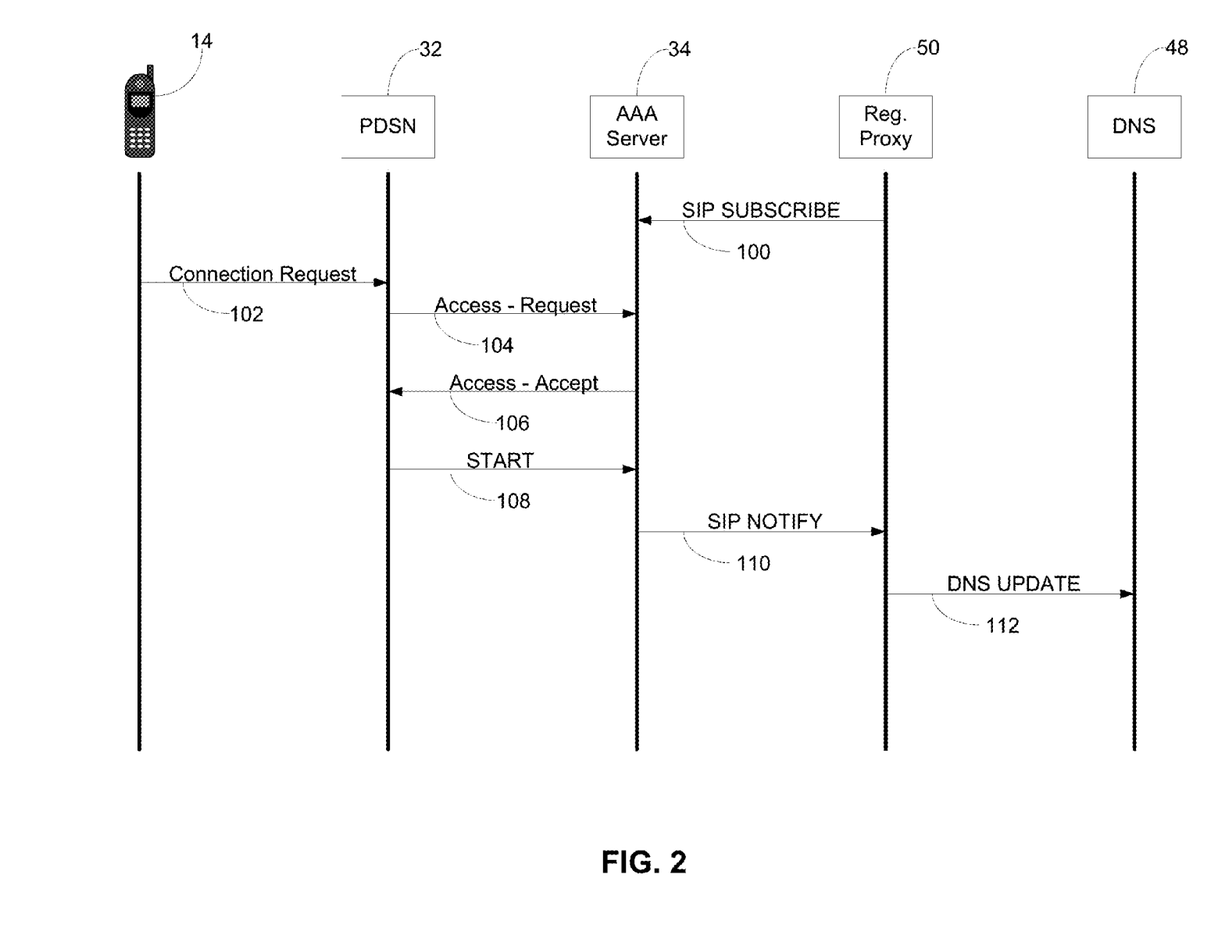
FIG. 2 is a call flow diagram illustrating a registration method, in accordance with an exemplary embodiment.

FIG. 2 is a call flow diagram illustrating an exemplary registration method. The process may begin with registration proxy 50 sending a SIP SUBSCRIBE request to AAA server 34, as indicated by step 100. The SIP SUBSCRIBER request may ask AAA server 34 to notify registration proxy 50 when mobile nodes (or certain mobile nodes) become connected to packet-switched network 20 and to provide certain information in the notification regarding such newly-connected mobile nodes. In an exemplary embodiment, the information to be provided in the notification for a mobile node includes the mobile node's MDN and the IP address assigned to the mobile node. It is to be understood, however, that other information could be included in the notification.

Subsequently, mobile node 14 requests connection to packet-switched network 20, as indicated by step 102. To authenticate the request, PDSN 32 transmits a RADIUS Access-Request message to AAA server 34, as indicated by step 104. If the request is acceptable, AAA server 34 may respond with an Access-Accept message, as indicated by step 106. In a Simple IP implementation, PDSN 32 may then assign an IP address to mobile node 14. In a Mobile IP implementation, PDSN 32 may instead register mobile node 14 with a home agent (not shown), so that the home agent assigns an IP address to mobile node 14.

At that point, PDSN 32 is able to begin providing packet-data service to mobile node 14. To indicate the beginning of packet-data service, PDSN 32 may send a RADIUS Accounting START message to AAA server 34, as indicated by step 108. Based on the SIP SUBSCRIBE request of step 100, AAA server 34 responsively sends a SIP NOTIFY request to registration proxy 50, as indicated by step 110. As noted above, the SIP NOTIFY request includes the MDN and IP address of mobile node 14.

Registration proxy 50 then sends a DNS UPDATE message to DNS 48 to register an association between the IP address and hostname of mobile node 14, as indicated by step 112. More particularly, the DNS UPDATE message may be used to create an "A" record for an IPv4 address and/or an "AAAA" record for an IPv6 address. The DNS UPDATE message may also be used to create other records for mobile node 14 in DNS 48. For example, the DNS UPDATE message may be used to create one or more "SRV" records for mobile node 14. For example, an SRV record may be used to identify a port number that mobile node 14 uses to receive SMS-over-SIP messages.

Registration proxy 50 may construct the hostname for mobile node 14 by concatenating the MDN of mobile node 14 (e.g., in an E.164 format) with a domain name of the service provider for mobile node 14. To construct the hostname in this way, registration proxy 50 may query one or more external databases.

The DNS UPDATE message from registration proxy 50 may also specify a time-to-live (TTL) value for the registration. The TTL value could, for example, correspond to the lifetime of the mobile node's IP session. That way, when the mobile node's IP session expires, the mobile node's DNS registration will also expire. The TTL value may be statically defined in registration proxy 50, or registration proxy may query an external database to obtain the TTL value. Alternatively, registration proxy may provide a very large TTL value (e.g., several weeks or months) in the DNS UPDATE message. Then, when the mobile node's DNS registration is to be cleared, registration proxy 50 may send another DNS UPDATE message that provides a TTL value of 0 for the mobile node's A/AAAA and/or SRV records.

4. Exemplary Messaging Method

Figure 3:
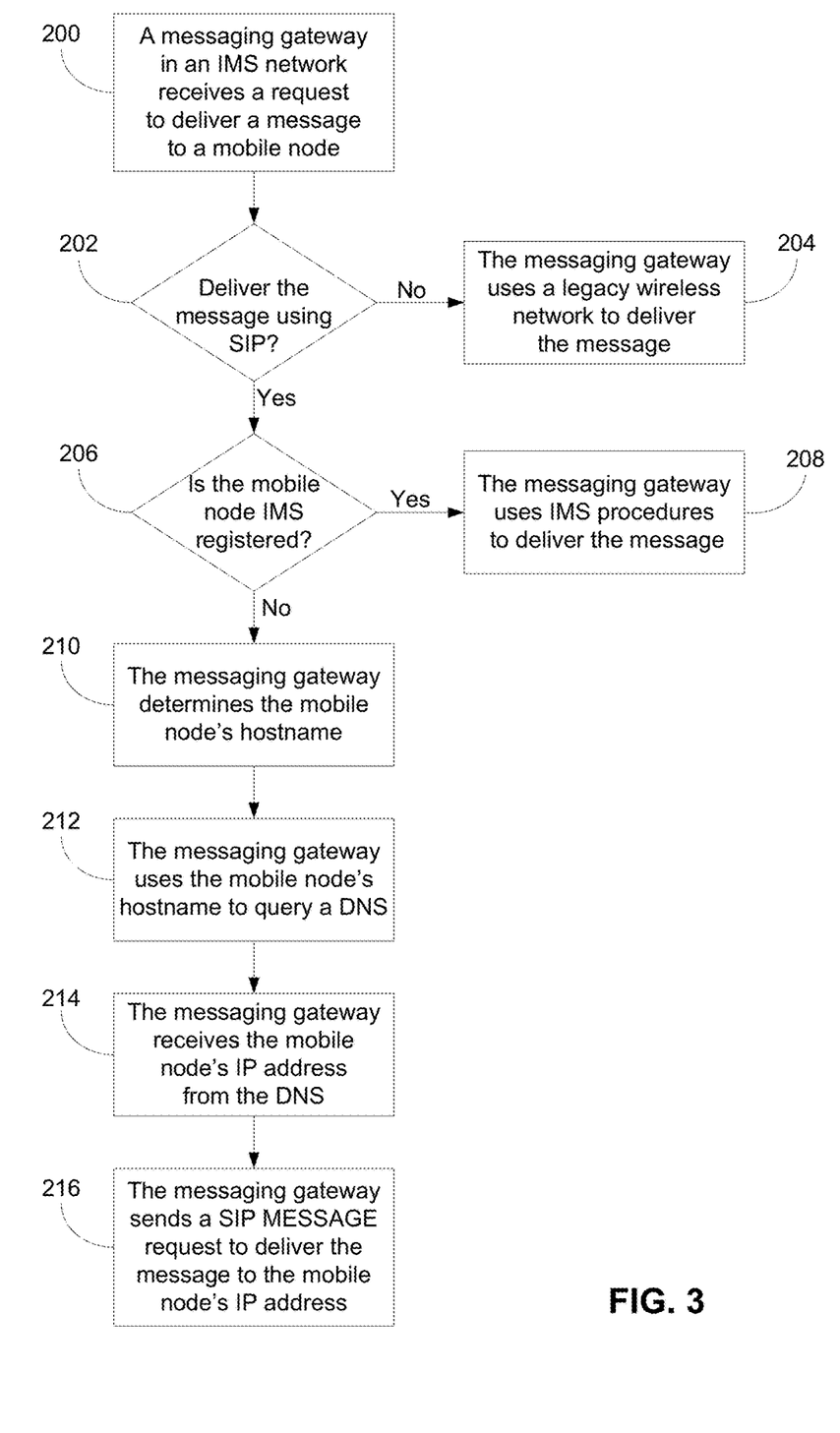
FIG. 3 is a flow chart illustrating a method of delivering a message to a mobile node, in accordance with an exemplary embodiment.

FIG. 3 is a flow chart illustrating an exemplary method for delivering a message, such as an SMS message, to a mobile node. The method may make use of a network architecture as shown in FIG. 1. However, it is to be understood that other network architectures could be used.

The process may begin when a messaging gateway in an IMS network (e.g., SMS-GW 30 in IMS network 36) receives a request to deliver a message to a mobile node (e.g., mobile node 14), as indicated by block 200. The message may include text, graphics, audio, and/or video. Thus, the message could be an SMS message, an MMS message, IM, or other type of message. The messaging gateway could receive the message request from MAP network 24 (e.g., an SMDPP message) or from an entity in packet-switched network 20 (e.g., SME 46). The message request may identify the recipient mobile node by MDN or in some other manner.

The messaging gateway may then determine whether to deliver the message to the mobile node using SIP, as indicated by block 202. This determination may depend on factors such as the capabilities and preferences of the recipient mobile node. For example, the messaging gateway may query C/P server 52 to determine whether the mobile node is capable of receiving such messages using SIP and, if so, whether the mobile node has any preferred method of message delivery. Alternatively, the messaging gateway may determine whether to use SIP for the message delivery based on other factors, such as the recipient mobile node's MDN, the mobile node's location, the time of day, network load, etc.

If the messaging gateway determines not to use SIP to deliver the message, then the messaging gateway may use a legacy wireless network (e.g., network 18) to deliver the message, as indicated by block 204. For example, to deliver an SMS message to mobile node 14, SMS-GW 30 may query HLR 26 via MAP network 24 to determine that mobile node 14 is currently being served by MSC 22. SMS-GW 30 may then send an SMDPP request to MSC 22 via MAP network 24.

On the other hand, if the messaging gateway determines to use SIP to deliver the message, then the messaging gateway may use either an IMS registration or an alternative registration to locate the mobile node. In particular, the messaging gateway may first determine whether the mobile node is IMS registered, as indicated by block 206. To make this determination, the messaging gateway may query an HSS in the IMS network (e.g., HSS 44 in IMS network 36). If the mobile node has an IMS registration, the messaging gateway may then deliver the message using IMS procedures, i.e., by sending a SIP MESSAGE to the S-CSCF currently serving the mobile node, as indicated by block 208.

If the mobile node does not have an IMS registration, the messaging gateway may query a DNS (e.g., DNS 48) to determine how to deliver the message using SIP. To do this, the messaging gateway may first determine the mobile node's hostname, as indicated by block 210. The mobile node's hostname could be, for example, the mobile node's MDN (e.g., as included in the message request that the messaging gateway received) concatenated with the domain name of the mobile node's service provider. The messaging gateway may query one or more external databases to determine the mobile node's hostname based on its MDN.

The messaging gateway then uses the mobile node's hostname to query the DNS, as indicated by block 212. In response, the messaging gateway receives the mobile node's IP address from the DNS, as indicated by block 214. The response from the DNS may also include other information, such as a port number that the mobile node uses to receive SMS or other messages that are carried over SIP.

The messaging gateway then sends a SIP MESSAGE request to deliver the message to the mobile node's IP address, as indicated by block 216. If the messaging gateway received a preferred port number from the DNS, then the SIP MESSAGE request may also be directed to this port number. Alternatively, the SIP MESSAGE request may be directed to a default port number.

Figure 4:
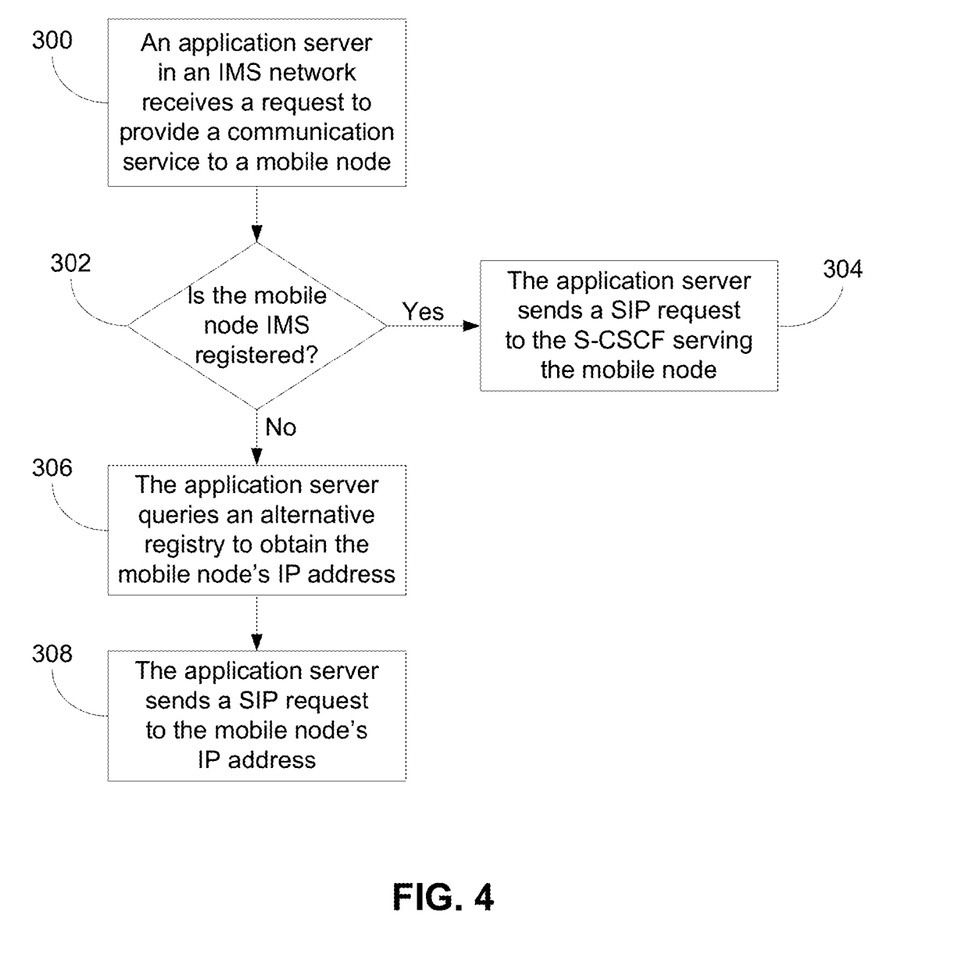
FIG. 4 is a flow chart illustrating a method of providing a communication service to a mobile node, in accordance with an exemplary embodiment.

FIG. 3 illustrates how a messaging gateway in an IMS network can use SIP to provide messaging services to mobile nodes that are not IMS registered. It is to be understood, however, that an application server in an IMS network can use SIP to provide other types of communication services to mobile nodes that are not IMS registered, as illustrated in FIG. 4.

The process may begin when an application server in an IMS network (e.g., AS 42 in IMS network 36) receives a request to provide a communication service to a mobile node (e.g., mobile node 14), as indicated by block 300. The requested communication service could be a VoIP service, e-mail service, gaming service, or any other type of communication service. The request could be a SIP request (or other packet-protocol request) that the application server receives from an entity within packet-switched network 20. Alternatively, the request could be a request from a legacy system. For example, the application server might receive the request from MAP network 24.

How the application server attempts to provide the communication service may depend on whether the recipient mobile node is IMS registered. Thus, the application server may determine whether the mobile node is IMS registered, as indicated by block 302. In some cases, the application server may make this determination by querying an HSS in the IMS network (e.g., HSS 44). Alternatively, the application server may have previously subscribed to receive notifications of registrations from the HSS.

If the application server determines that the mobile node is IMS registered, then the application server may follow IMS procedures to provide the requested communication service to the mobile node. In particular, the application server may determine from the mobile node's IMS registration which S-CSCF is currently serving the mobile node and send a SIP request to that S-CSCF, as indicated by block 304.

If the application server determines that the mobile node is not IMS registered, then the application server may query an alternative registry to obtain the mobile node's IP address, as indicated by block 306. The alternative registry could be, for example, a DNS. Thus, the application server may determine the mobile node's hostname from the mobile node's MDN or other identifier contained in the request and query the DNS to find what IP address is associated with that hostname (e.g., as described above for FIG. 3). It is to be understood, however, that the use of DNS is exemplary only, as an application server may be able to refer to other types of registries to obtain the mobile node's IP address.

Once the application server obtains the mobile node's IP address, the application server may send a SIP request directly to that IP address in order to provide the requested communication server, as indicated by block 308. In some cases, the application server may also direct the SIP request to a specific port number, for example, based on the type of communication server and/or the port number registered in the DNS or other alternative registry.

In this way, the infrastructure of an IMS network may be used to provide messaging services or other communication services to mobile nodes that are SIP-capable but are not able to effect IMS registrations.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method comprising:
   a messaging gateway receiving a request to deliver a message to a mobile node, said request including an identifier of said mobile node;
   said messaging gateway determining that said mobile node is Session Initiation Protocol (SIP) capable;
   said messaging gateway determining a hostname of said mobile node based on said identifier of said mobile node and a domain name of a wireless service provider of said mobile node;
   said messaging gateway sending a query to a domain name server (DNS), said query including said hostname;
   said messaging gateway receiving a response from said DNS, said response including a network address of said mobile node; and
   said messaging gateway using SIP to transmit said message to said network address.

2. The method of claim 1, wherein said messaging gateway is a short message service gateway (SMS-GW).

3. The method of claim 1, wherein said request is a short message service delivery point-to-point (SMDPP) request.

4. The method of claim 1, wherein said identifier of said mobile node is a mobile directory number (MDN) of said mobile node.

5. The method of claim 4, wherein said hostname of said mobile node is determined by concatenating said MDN of said mobile node with said domain name of said wireless service provider of said mobile node.

6. The method of claim 1, wherein said network address is an Internet Protocol (IP) address.

7. The method of claim 1, further comprising:
   registering an association between said hostname and said network address in said DNS.

8. The method of claim 1, wherein said messaging gateway using SIP to transmit said message to said network address comprises:
   said messaging gateway transmitting a SIP MESSAGE request.

9. The method of claim 1, wherein said messaging gateway determining that said mobile node is Session Initiation Protocol (SIP) capable comprises:
   said messaging gateway querying a capabilities server, wherein said capabilities server stores indications of capabilities of mobile nodes.

10. The method of claim 1, wherein said messaging gateway is in an Internet Protocol Multimedia Subsystem (IMS) network, further comprising:
    said messaging gateway determining whether said mobile node is IMS registered.

11. A system comprising:
    a domain name server (DNS) storing associations between hostnames and Internet Protocol (IP) addresses of mobile nodes; and
    a messaging gateway configured to, in response to receiving a request to deliver a message to a mobile node, determine whether said mobile node is Session Initiation Protocol (SIP) capable, and in response to a determination that said mobile node is SIP capable:
    (a) determine a hostname of said mobile node based on an identifier of said mobile node included in said request and a domain name of a wireless service provider of said mobile node;
    (b) query said DNS to obtain an IP address associated with said hostname; and
    (c) transmit a SIP request to said IP address, said SIP request containing said message to be delivered to said mobile node.

12. The system of claim 11, further comprising:
    a capabilities server that stores indications of capabilities of mobile nodes, wherein said messaging gateway is configured to query said capabilities server to determine whether said mobile node is SIP capable.

13. The system of claim 12, wherein said identifier of said mobile node included in said request is a mobile directory number (MDN) of said mobile node.

14. The system of claim 13, wherein said hostname of said mobile node is determined by concatenating said MDN of said mobile node with said domain name of said wireless service provider of said mobile node.

15. A method comprising:
    a messaging gateway receiving a request to deliver a message to a mobile node, said request including an identifier of said mobile node;
    in response to said request, said messaging gateway determining whether to deliver said message using a packet-based protocol, wherein said messaging gateway determining whether to deliver said message using said packet-based protocol comprises said messaging gateway querying a capabilities server to determine whether said mobile node supports said packet-based protocol; and
    in response to a determination to deliver said message using said packet-based protocol:
    said messaging gateway determining a hostname of said mobile node based on said identifier of said mobile node and a domain name of a wireless service provider of said mobile node;
    said messaging gateway sending a query to a domain name server (DNS), said query including said hostname;

said messaging gateway receiving a response from said DNS, said response including a network address of said mobile node; and said messaging gateway using said packet-based protocol to transmit said message to said network address.

16. The method of claim 15, wherein said messaging gateway using said packet-based protocol to transmit said message to said network address comprises said messaging gateway transmitting a Session Initiation Protocol (SIP) request to said network address.

17. The method of claim 15, wherein said request is a short message service delivery point-to-point (SMDPP) request.

18. The method of claim 15, wherein said messaging gateway determining whether to deliver said message using said packet-based protocol further comprises:

said messaging gateway querying a preferences server to determine whether said mobile node has a preferred method of message delivery.

19. The method of claim 15, wherein said identifier of said mobile node is a mobile directory number (MDN) of said mobile node.

20. The method of claim 19, wherein said hostname of said mobile node is determined by concatenating said MDN of said mobile node with said domain name of said wireless service provider of said mobile node.

* * * * *